(12) United States Patent
Sjöö

(10) Patent No.: US 6,599,050 B1
(45) Date of Patent: Jul. 29, 2003

(54) TOOL COUPLING

(75) Inventor: Sture Sjöö, Gävle (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/914,210

(22) PCT Filed: Feb. 10, 2000

(86) PCT No.: PCT/SE00/00270

§ 371 (c)(1),
(2), (4) Date: Nov. 9, 2001

(87) PCT Pub. No.: WO00/53362

PCT Pub. Date: Sep. 14, 2000

(30) Foreign Application Priority Data

Feb. 26, 1999 (SE) ................................. 9900705

(51) Int. Cl.[7] ............................................... B23B 29/12
(52) U.S. Cl. ...................................... 403/97; 403/374.3
(58) Field of Search ............................... 403/97, 374.3; 409/233; 82/37; 279/58

(56) References Cited

U.S. PATENT DOCUMENTS 4,547,092 A * 10/1985 Vetter et al. ................. 403/59
4,632,614 A    12/1986 Rall et al.
5,555,784 A     9/1996 Muendlein et al.
6,106,181 A *  8/2000 Neuhof ........................ 403/84
6,244,780 B1    6/2001 Hansson
6,409,411 B1 * 6/2002 Crorey ........................ 403/97

FOREIGN PATENT DOCUMENTS

JP    60-118401    6/1985

* cited by examiner

Primary Examiner—Lynne H. Browne
Assistant Examiner—John Cottingham
(74) Attorney, Agent, or Firm—Burns, Doane, Swecker & Mathis, LLP

(57) ABSTRACT

A tool coupling includes a holder and an adapter attachably interconnected by a serrated coupling. A fastening screw extends in both the adapter and the holder and is arranged coaxially with a center axis defined by the adapter and the holder. The screw is threadedly connected with the holder and includes a cooling passage therein for conducting cooling medium from the holder to the adapter for cooling a cutting insert carried by the holder.

6 Claims, 5 Drawing Sheets

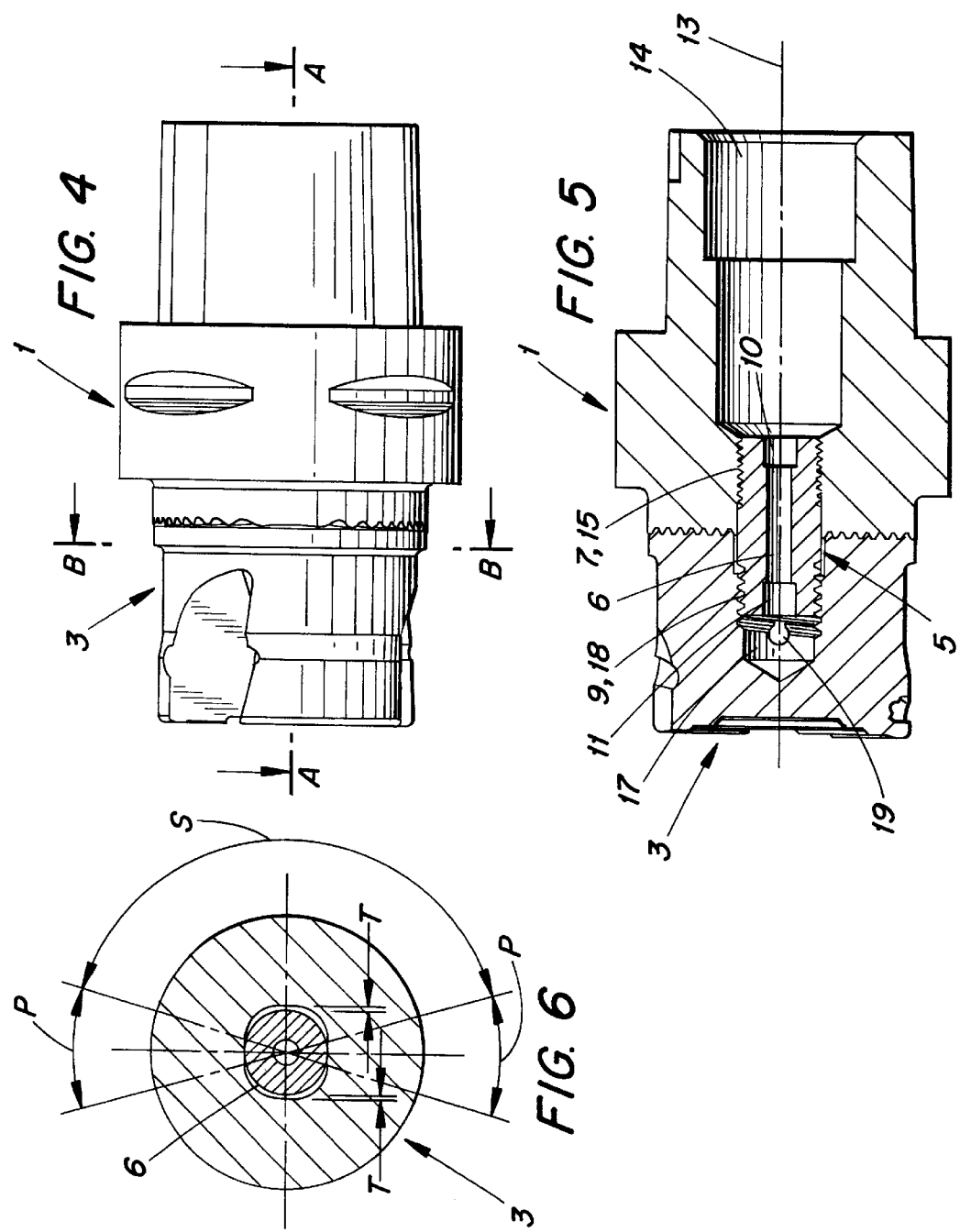

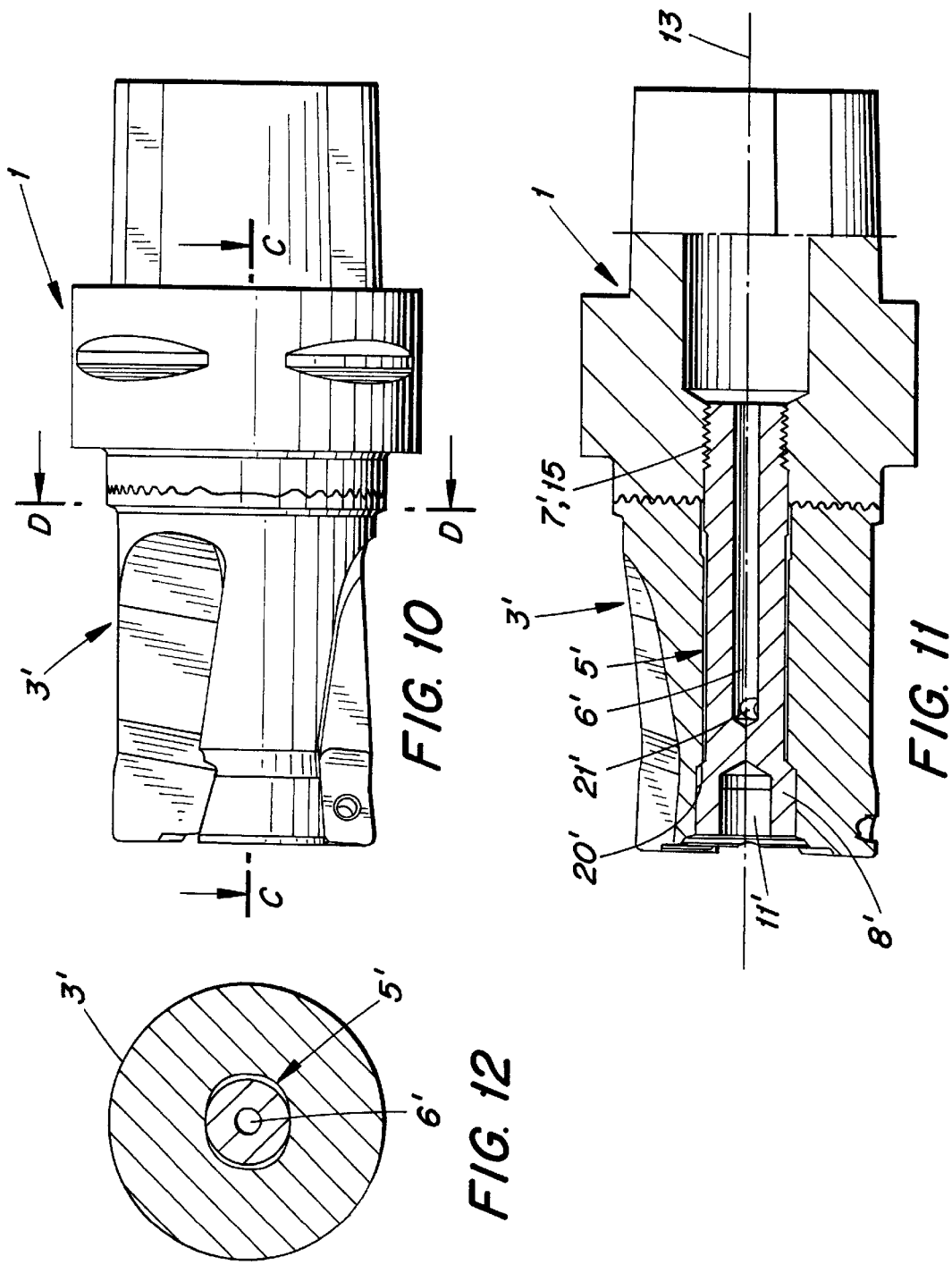

TOOL COUPLING

TECHNICAL FIELD OF THE INVENTION

The present invention relates to a tool coupling comprising a holder, an adapter for at least one cutting insert for chip removing machining and a separate element in order to detachably connect the holder and the adapter with each other, said holder being provided with a first serration having mutually parallel grooves, and the adapter being provided with a second serration having mutually parallel grooves. The invention also relates to the holder and the adapter per se.

PRIOR ART

From WO 93/10929 (corresponding to Muendlein et al. U.S. Pat. No. 5,555,784), a turning tool is previously known, said turning tool having a cylindrical shaft and a head having a contact surface that rests against a support surface of the shaft. The contact surface and the support surface are arranged at an acute angle relative to the longitudinal center axis of the tool and each of said surfaces is provided with serrations having mutually parallel grooves, said serrations engaging each other when the contact surface and the support surface are resting against each other. In order to connect the shaft and the head with each other holes are provided in said elements, said holes extending essentially perpendicular to said surfaces and are located directly opposite to each other when the contact surface and the support surface are resting against each other in correct position. A threaded screw is received in said holes in order to urge the surfaces against each other and provide a reliable connection between the shaft and the head.

The holes in the shaft and the head are designed in such a way that they have a larger cross dimension in a direction perpendicular to the serrations than in the longitudinal direction of the serrations. By this arrangement it is achieved that the serrations guide the mutual orientation of the shaft and the head in a direction perpendicular to the longitudinal direction of the grooves while the fit of the hole relative to the screw guides the mutual orientation of the shaft and the head in a direction parallel to the longitudinal direction of the grooves.

Since the contact surface and the support surface form an angle with the longitudinal center axis of the tool also the threaded screw that connects the shaft with the head forms an angle with said longitudinal center axis. This arrangement causes problems as regards the provision of cooling passages that have to be located eccentrically in the shaft. Especially in connection with rotating tools it is not beneficial to locate the cooling passages eccentrically. Said eccentric location of the cooling passages also brings about that the shaft may not be used both for right-hand type tools and left-hand type tools.

OBJECTS AND FEATURES OF THE INVENTION

The object of the present invention is to set aside the disadvantages of known tool couplings and create a tool coupling that is usable for different types of chip removing machining, e.g. milling, turning and drilling.

A primary object of the invention is that the tool coupling should be usable in connection with tools that rotate at an extremely high speed, i.e. the tool coupling should not generate vibrations or the like due to unbalance of said tool coupling.

Still an object of the invention is that the tool coupling should make it possible for the holder and the adapter to be connected with each other by means of simple connecting means, preferably of standard type.

A further object of the invention is that the tool coupling generally should be usable both for tools of right-hand type and left-hand type.

The objects of the invention are realized by means of a tool coupling that comprises a holder and an adapter detachably connected to the holder and adapted to carry a cutting insert. The holder and the adapter define a longitudinal center axis. The holder includes first serrations lying in a plane oriented transversely to the center axis. The adapter includes second serrations lying in a plane oriented transversely to the center axis. The first and second serrations are in meshing engagement with one another. The holder and the adapter include first and second cooling passages, respectively, for conducting cooling medium. A fastening screw extends in both the adapter and the holder and is arranged coaxially with the center axis. The screw is threadedly connected with the holder and includes a third cooling passsage therein for conducting cooling medium from the first cooling passage to the second cooling passage.

Preferably, the holder includes an internally threaded first opening threadedly connected to an externally threaded second end of the screw. The adapter includes a second opening in which a second end of the screw is disposed. The first and second openings have an elongated cross sectional shape defined by long and short dimensions, respectively. The long dimension extends in a direction perpendicular to the serrations, and the short dimension extends in a direction parallel to the serrations.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 4 shows a top view of the tool coupling according to FIG. 1;

FIG. 5 shows a section along A—A in FIG. 4;

FIG. 6 shows a section along B—B in FIG. 4;

FIG. 10 shows a top view of the tool coupling according to FIG. 7;

FIG. 11 shows a section along C—C in FIG. 10;

FIG. 12 shows a section along D—D in FIG. 10; and

DETAILED DESCRIPTION OF PREFERRED EMBODIMENTS

Figure 1:
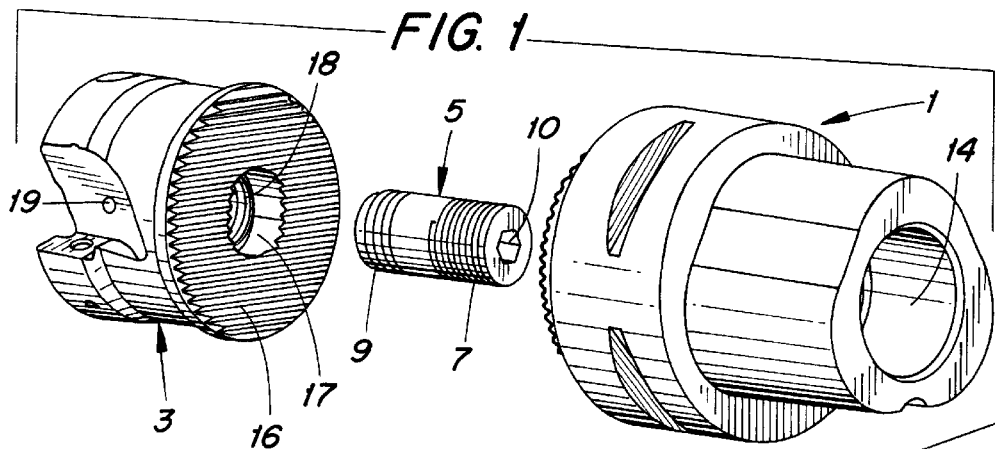
FIG. 1 shows a perspective view of a first embodiment of a tool coupling according to the present invention, said view being taken obliquely from behind of the holder.

The first embodiment of a tool coupling according to the present invention, shown in FIGS. 1–6, comprises a holder 1, an adapter 3 and a connecting element in the shape of a stud screw 5 having a first external thread 7 at one end and a second external thread 9 at its other end. In the shown embodiment the threads 7, 9 run in the same direction but have different pitch, the second external thread 9 having a larger pitch than the first external thread 7. The stud screw 5 is also provided with key recesses 10 and 11 respectively at its both ends. From FIGS. 5 and 6 it is evident that the stud screw 5 is provided with an axially extending, through going, first cooling passage 6 that is located in the center of the stud screw 5.

Figure 2:
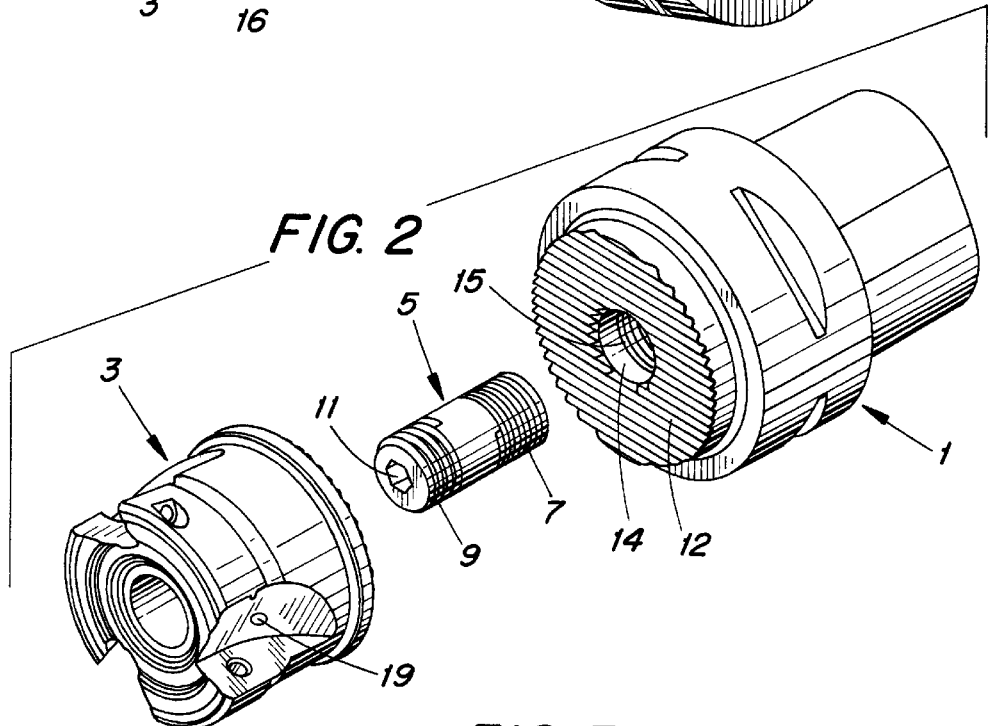
FIG. 2 shows a perspective view of the tool coupling according to FIG. 1, said view being taken obliquely from the front of the adapter.

As is most evident from FIG. 2 the holder 1, at one of its axial end surfaces, is provided with a first serration 12 having grooves extending parallel to each other. Said axial end surface of the holder 1 is generally planar and has an extension perpendicular to a longitudinal center axis 13, see FIG. 5, of the tool coupling, said axis 13 also constituting a longitudinal center axis of the holder 1 and the adapter 3. As is most evident from FIG. 5 the holder 1 is provided with an internal, through going, first center hole 14 having sections of different diameter, the section of the first center hole 14, located closest to the end surface having the first serration 12, is provided with a first internal thread 15. In this connection it should be pointed out that the design of said first center hole 14, in the area of the end facing away from a the first serration 12, may vary to a great extent depending on which type of holder 1 that is used in the actual case. In the embodiment shown in FIGS. 1–6 a holder 1 is used that is part of a holder system manufactured under the trade name of COROMANT CAPTO®.

As is most evident from FIG. 1 the adapter 3, at one of its axial end surfaces, is provided with a second serration 16 having grooves extending parallel to each other. Said axial end surface of the adapter 3 being generally planar and having an extension perpendicular to a longitudinal center axis 13, see FIG. 5, of the tool coupling. As is most evident from FIG. 5 the adapter 3 is provided with an internal, not through going, i.e., blind, second center hole 17 that has an internal second thread 18. From said second center hole 17 a number of second cooling passages 19 extend radially outwards in order to emerge in the seats of the cutting inserts of the adapter 3.

Figure 13:
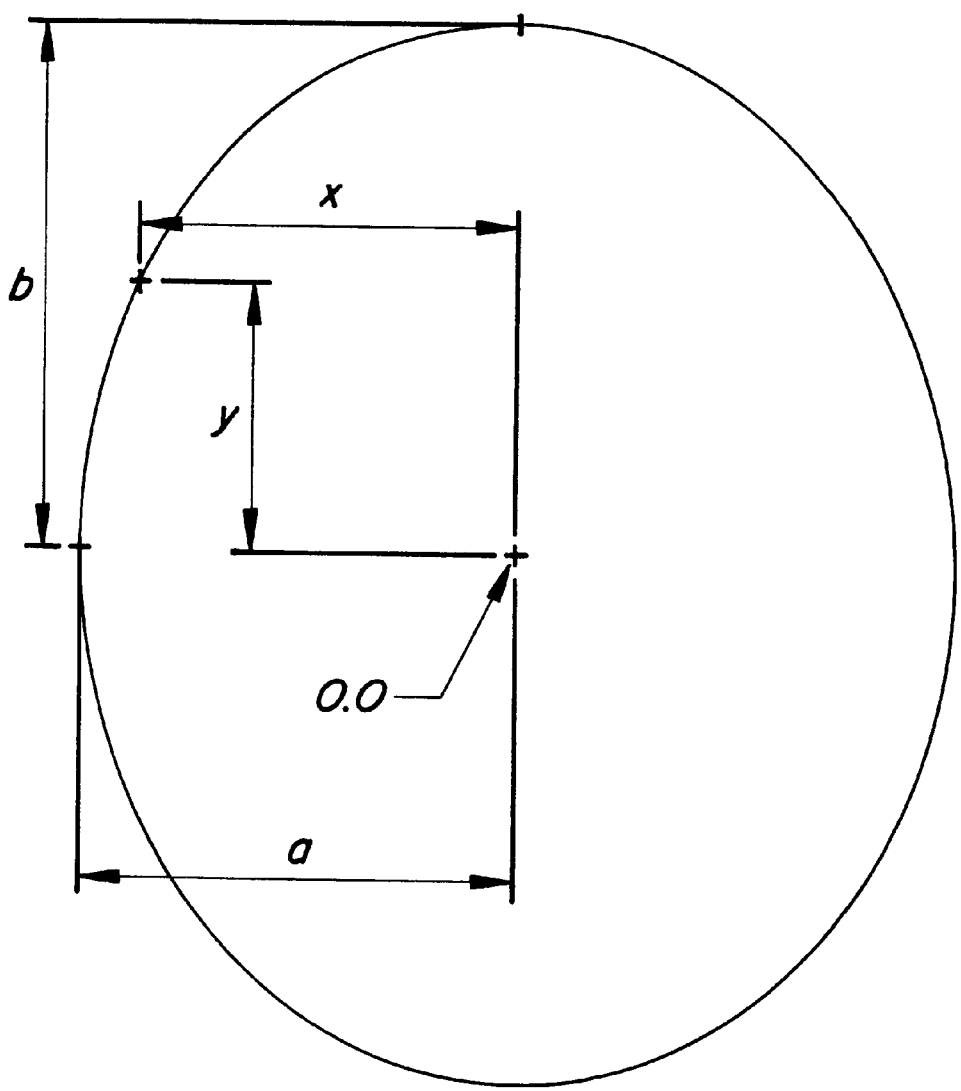
FIG. 13 shows in a larger scale a preferred elliptic cross section of the holes in the holder and the adapter.

Reference is being made to FIG. 13 as regards the cross sectional shape of the holes 14 and 17, in the area adjacent the axial end surfaces having the serrations 12, 16. Generally, said holes 14, 17 have an oval or out of round cross section, said cross section having a larger cross dimension in the direction perpendicular to the grooves of the serrations 12, 16 than the cross dimension parallel to the grooves of the serrations 12, 16. Preferably, the cross section of the holes 14, 17 is elliptic in the actual area, a preferred elliptic cross section is shown in FIG. 13. In this connection it should be reminded that the equation of the ellipse is the following: $x^2/a^2+y^2/b^2=1$. A preferred relation for a/b= 0.95–0.99. A preferred value for a=2–10 mm.

The ovality of the holes 14, 17 may be achieved by means of an end mill subsequent to the provision of the basic shape of the holes 14, 17, e.g. by means of a reamer.

In the embodiment according to FIGS. 1–6 the adapter 3 is designed as a milling head that is provided with a number of cutting insert seats. As has been pointed out above, said second cooling passages 19 emerge in said cutting insert seats.

When the tool coupling according to the present invention is transferred to active position the stud screw 5 is threaded into the holder 1, i.e. the first external thread 7 engages a first internal thread 15. Then the adapter 3 is threaded on the projecting portion of the stud screw 5 that hereby is fixed against rotation, i.e. the second external thread 9 engages the second internal thread 18. Alternatively, the stud screw 5 may be threaded into the adapter 3 and the holder 1 threaded on the projecting portion of the stud screw 5. However, in this case it is more difficult to lock the stud screw 5 against rotation. The axial end surfaces, having serrations 12, 16, will be located adjacent each other but at some distance from each other. In this connection it should be pointed out that the groove configuration of the respective serrations 12, 16 has a mutually adapted design, i.e. the angles of the flanks of the threads are the same.

Then the mutual connection of the holder 1 and the adapter 3 proceeds by having the stud screw 5 rotated in the direction that causes the stud screw 5 to be displaced further into the second center hole 17. In this connection it is supervised that the grooves of the respective serrations 12, 16 are oriented parallel to each other. Said displacement of the stud screw 5 in the second center hole 17 brings about, due to the different pitch of the external threads 7 and 9 respectively and the internal threads 15 and 18 respectively, that the holder 1 and the adapter 3 are pushed together until the serrations 12, 16 are in complete engagement with each other. At a certain rotation of the stud screw 5, said stud screw 5 will be displaced a longer distance relative to the adapter 3 than relative to the holder 1. When the connection between the holder 1 and the adapter 3 is to be terminated the stud screw 5 is rotated in the opposite direction compared to when the connection is established.

In the connecting phase when the serrations 12, 16 come into engagement with each other the oval cross section of the holes 14 and 17, adjacent said serrations 12, 16, is of importance, see FIG. 6. The smallest cross dimension of the holes 14, 17, in a direction parallel to the grooves of the serrations 12, 16, has a precise slide fit relative to the diameter of the stud screw 5. This means that the holes 14, 17 and the stud screw 5 guide the mutual orientation of the holder 1 and the adapter 3 in the direction parallel to the grooves of the serrations 12, 16. In the direction perpendicular to the grooves of the serrations 12, 16 the cooperation between the respective serrations 12, 16 guides the mutual orientation between the holder 1 and the adapter 3. This being enabled due to the fact that the holes are oval in said direction perpendicular to the grooves of the serrations 12, 16.

In FIG. 6 the sector P is drawn, within which a slide fit exists between the stud screw 5 and the holes 15 and 17, and in FIG. 6 also the sector S is drawn, within which there is a gap T between the stud screw 5 and the holes 15 and 17. A suitable interval for the sector P=30°–50° and for the sector S=120°–150°. Generally, P+S=180°. Suitable value of the gap T=0.05–0.5 mm.

Figure 3:
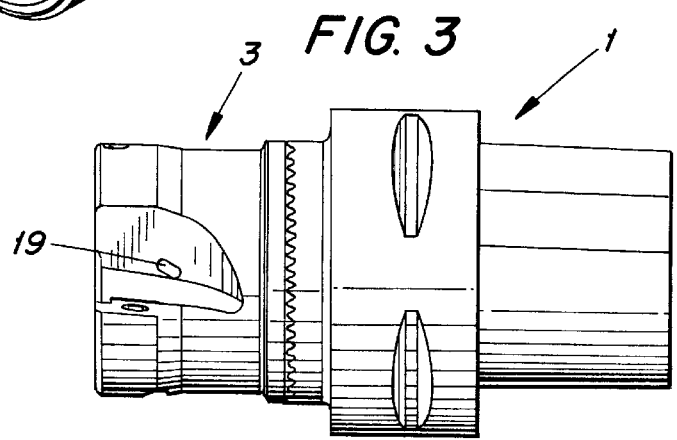
FIG. 3 shows a side view of the tool coupling according to FIG. 1.
Figure 7:
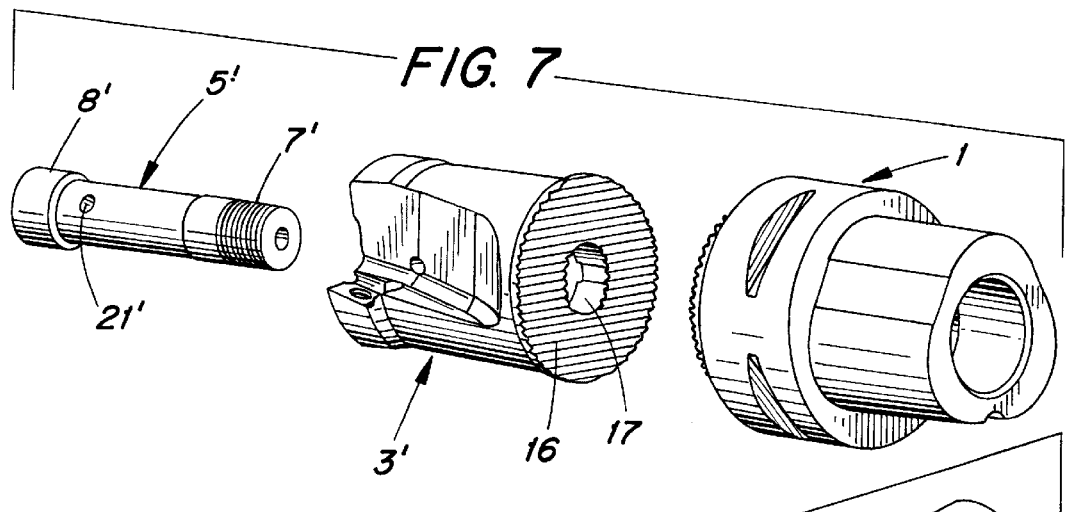
FIG. 7 shows a perspective view of the second embodiment of a tool coupling according to the present invention, said view being taken obliquely from behind of the holder.
Figure 8:
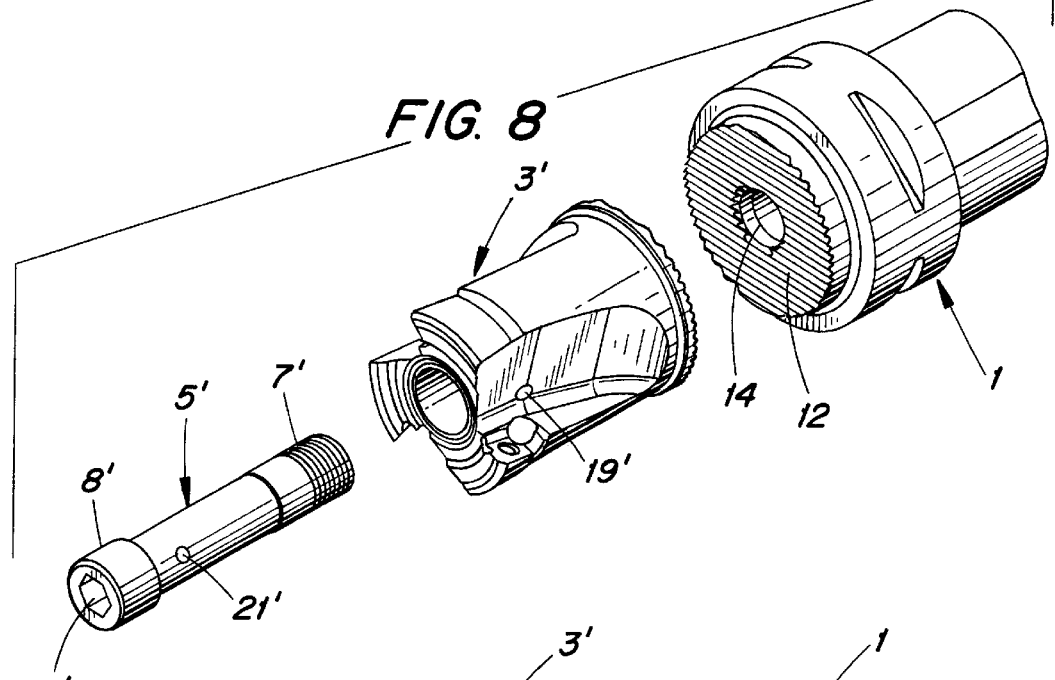
FIG. 8 shows a perspective view of the tool coupling according to FIG. 7, said view being taken obliquely from the front of the adapter.

The holder 1 and the adapter 3 are thus brought to assume the mutual position that is shown in FIGS. 3–5. In this connection it should be pointed out that in said mutual position of the holder 1 and the adapter 3 the axial distance between the two external threads 7 and 9 essentially correspond to the axial distance between the two internal threads 15 and 18.

As is evident from FIGS. 5 and 6 the stud screw 5 is provided with an axial, through going, first cooling passage 6. Cooling medium that is supplied at the right end of the stud screw 5 in FIG. 5 thus exits at the left end of the blind second center hole 17 in FIG. 5. From there the cooling medium is further transmitted via the second cooling passages 19 that emerge in the cutting insert seats of the adapter 3 designed as a milling head.

The alternative embodiment of the tool coupling according to the present invention, shown in FIGS. 7–12, differs from the embodiment described above primarily in that the connecting element 5' is designed as a screw having a first external thread 7' at one end and a head 8' at its other end. At said other end the screw 5' is provided with a key recess 11'. The first external thread 7' is intended to be received in a holder 1 that could be identical with the holder 1 described above. This is of course a benefit of the tool coupling according to the present invention.

As is most evident from FIG. 11 the screw 5' is provided with an axially extending, not through going (i.e., blind), first cooling passage 6' that extends from and penetrates the end of the screw 5' that is equipped with the first external thread 7'. The first cooling passage 6' terminates at a distance from the end of the screw 5' that is equipped with a key recess 11'. A number of branch cooling passages 21' start from said first cooling passage 6', in the area where said cooling passage 6' terminates at distance from the key recess 11', said branch cooling passages 21' penetrating the circumferential surface of the screw 5', see FIGS. 7 and 8. As is evident from FIGS. 7, 8 and 11 the screw 5' is provided with a waist, i.e. a reduction of diameter, in the area where the branch cooling passages 21' emerge. Thereby, a space is created for the cooling medium between the screw 5' and the second center hole 17'. The first cooling passage 6' is located in the of the screw 5'.

The adapter 3' of the embodiment according to FIGS. 7–12 is also in the shape of a milling head, said adapter 3' being intended to cooperate with the head 8' of the screw 5'. For this reason the adapter 3' has certain structural differences compared to the adapter 3 according to FIGS. 1–6. However, the serration 16 provided at one axial end surface is in principle identical with the first serration 16 of the embodiment according to FIGS. 1–7. Also the extension of said axial end surface corresponds to the embodiment according to FIGS. 1–7.

As is most evident from FIG. 11 the second center hole 17' in the adapter 3' is through going without having any internal thread. The second center hole 17' has a shoulder 20' in the area of the end of the adapter 3' where the cutting insert seats are located, said shoulder 20' being intended to cooperate with the head 8' of the screw 5'.

Figure 9:
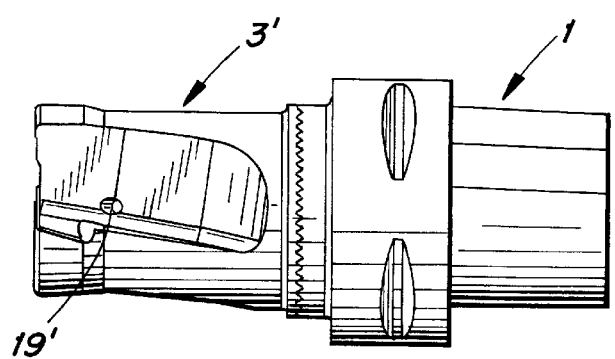
FIG. 9 shows a side view of the tool coupling according to FIG. 7.

In correspondence to the embodiment according to FIGS. 7–12 second cooling passages 19' are provided in the adapter 3', said second cooling passages 19' extending radially from the second, through going, center hole 17' and emerge in the cutting insert seats of the adapter 3', see for instance FIG. 9. Cooling medium that is supplied at the right end of the screw 5' in FIG. 11 thus flows through the first cooling passage 6', through the branch cooling passages 21', out into the space between the portion of the screw 5' having reduced diameter and the second center hole 17' and through the second cooling passages 19'.

When the tool coupling according to the embodiment shown in FIGS. 7–12 is transferred to active position the holder 1 and the adapter 3' are located relative to each other as is shown in FIGS. 9–11, i.e. the respective serrations 12, 16 are in engagement with each other. Then the screw 5' is inserted from the left end in FIG. 11, i.e. the screw 5' extends through the second center hole 17' and its external first thread 7' is brought into engagement with the internal thread 15 of the holder 1'. Through suitable tightening of the screw 5' a proper mutual connection is achieved between the holder 1 and the adapter 3'. When the connection is to be terminated the screw 5' is rotated in opposite direction. In this connection it should be mentioned that the mutual relation between the cross section of the screw 5' and the cross sections of the holes 15 and 17, see for instance FIG. 12, in principle corresponds to the relation that exists between the cross section of the stud screw 5 and the cross sections of the holes 15 and 17, and therefore reference is made to what has been said above regarding the effects of said cross section relation. As regards the extension of the sectors for fit and gap reference is also made to FIG. 6 and adherent passages in the description above. The corresponding is also valid for the preferred cross section design that is shown in FIG. 13, i.e. said design is also valid for the hole 17'.

Preferably, the tool coupling described above is symmetrical in relation to its longitudinal center axis 13, which means that the holder may be used both for tools of right-hand type and left-hand type. In certain special applications, for instance in connection with certain special types of turning, it may be preferable if the adapter 3; 3' may be rotated 180° relative to the holder 1. This may be effected by the tool coupling according to the present invention.

Feasible Modifications of the Invention

In the embodiment according to FIGS. 1–7 the internal, second center hole 17 is not through going. However, within the scope of the invention it is feasible that said second center hole is through going and in such a case cooling medium will be ejected at the left end of the adapter 3 in FIG. 5. Thereby, it is made possible that the stud screw 5 also may be activated from the left end of the adapter 3 in FIG. 5.

In the embodiments described above the holder is of the type COROMANT CAPTO®. Within the scope of the invention it is of course feasible to have a number of other holders, and in exemplifying and non-restricting purpose ISO-cone, VARILOCK® holder, cylindrical holders or prismatic holders should be mentioned.

In the embodiments described above the adapter 3; 3' is in the shape of a milling head. Within the scope of the invention other types of adapters are feasible, and in exemplifying and non-restricting purpose turning heads and drilling heads may be mentioned.

In the embodiment according to FIGS. 1–7 the external threads 7, 9 of the stud screw 5 run in the same direction but have a different pitch. Within the scope of the invention it is also feasible that the threads run in different directions (turnscrew), and in such a case they may have the same pitch.

What is claimed is:

1. A tool coupling comprising a holder and an adapter detachably connected to the holder and adapted to carry a cutting insert, the holder and the adapter defining a longitudinal center axis, the holder including first serrations lying in a plane oriented transversely to the center axis, the adapter including second serrations lying in a plane oriented transversely to the center axis, the first and second serrations being in meshing engagement with one another, the holder and the adapter including first and second cooling passages, respectively, for conducting cooling medium; a fastening screw extending in both the adapter and the holder and arranged coaxially with the center axis, the screw being threadedly connected with the holder and including a third cooling passage therein for conducting cooling medium from the first cooling passage to the second cooling passage.

2. The tool coupling according to claim 1 wherein the holder includes an internally threaded first opening threadedly connected to an externally threaded second end of the screw, the adapter including a second opening in which a second end of the screw is disposed, the first and second openings having an elongated cross-sectional shape defined by long and short dimensions, respectively, the long dimension extending in a direction perpendicular to the serrations, and the short dimension extending in a direction parallel to the serrations.

3. The tool coupling according to claim 1 wherein the screw includes external screw threads at its respective ends and is threadedly connected to the holder and the adapter, the third cooling passage extending completely through the screw.

4. The tool coupling according to claim 3 wherein the screw thread at one end of the screw has a different pitch than the screw thread at the other end of the screw.

5. The tool coupling according to claim 2 wherein the screw extends completely through the adapter and includes a head at one end thereof in engagement with the adapter, one end of the third cooling passage communicating with the second cooling passage and terminating within the screw.

6. The tool coupling according to claim 2 wherein the planes in which the first and second serrations lie are oriented perpendicular to the center axis.

* * * * *